US008605096B2

(12) United States Patent
Visser

(10) Patent No.: US 8,605,096 B2
(45) Date of Patent: Dec. 10, 2013

(54) ENHANCED CORONARY VIEWING

(75) Inventor: Cornelis Pieter Visser, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 699 days.

(21) Appl. No.: 12/739,968

(22) PCT Filed: Oct. 27, 2008

(86) PCT No.: PCT/IB2008/054422
§ 371 (c)(1),
(2), (4) Date: Apr. 27, 2010

(87) PCT Pub. No.: WO2009/057031
PCT Pub. Date: May 7, 2009

(65) Prior Publication Data
US 2010/0246957 A1 Sep. 30, 2010

(30) Foreign Application Priority Data
Nov. 2, 2007 (EP) .................................... 07119913

(51) Int. Cl.
*G06T 13/00* (2011.01)
*G09G 5/00* (2006.01)

(52) U.S. Cl.
USPC ............................ 345/475; 345/606; 345/660

(58) Field of Classification Search
None
See application file for complete search history.

(56) References Cited

U.S. PATENT DOCUMENTS

| 5,971,767 | A | 10/1999 | Kaufman et al. | |
|---|---|---|---|---|
| 6,083,162 | A | 7/2000 | Vining | |
| 6,343,936 | B1 | 2/2002 | Kaufman et al. | |
| 7,158,692 | B2 * | 1/2007 | Chalana et al. | 382/294 |
| 7,486,811 | B2 * | 2/2009 | Kaufman et al. | 382/128 |
| 2003/0011604 | A1 * | 1/2003 | Capers | 345/473 |

FOREIGN PATENT DOCUMENTS

| DE | 102005059209 A1 | 6/2007 |
|---|---|---|
| JP | 2006000338 A | 1/2006 |
| WO | 98/11524 A1 | 3/1998 |
| WO | 0055812 A1 | 9/2000 |
| WO | 0229764 A1 | 4/2002 |
| WO | 2006092542 A1 | 9/2006 |
| WO | 2006112895 A1 | 10/2006 |

OTHER PUBLICATIONS

Meissner et al: "Translucent and Opaque Direct Volume Rendering for Virtual Endoscopy Applications", Proceedings International Workshop on Volume Graphics, 2001, 12 Page Document.

* cited by examiner

*Primary Examiner* — Kee M Tung
*Assistant Examiner* — Leon T Cain, II

(57) ABSTRACT

Movies of volume rendered medical images that give an impression of the anatomy, become more and more important, because this type of visualization comes close to reality. An apparatus for creating a fly-path movie of a volume rendered medical image dataset is provided. The apparatus is configured to perform segmentation of an object, such as the coronary arteries, in the medical image dataset, such that key images on the fly-path may be defined with different classification and opacity. By fading from one to the other the coronaries are visualized one by one in an optimal way. A method, computer-readable medium and use are also provided.

20 Claims, 8 Drawing Sheets

ENHANCED CORONARY VIEWING

FIELD OF THE INVENTION

This invention pertains in general to the field of medical imaging. More particularly the invention relates to visualization of an object along a fly-path in a medical image dataset.

BACKGROUND OF THE INVENTION

Movies of volume rendered medical images that give an impression of the anatomy, become more and more important, because this type of visualization comes close to reality.

In cardiac imaging there is a desire to be able to visualize the coronary arteries of the heart in an acquired cardiac image dataset, for example to detect a stenosis in the coronary arteries or to visualize the coronary arteries to a surgeon before surgery is performed. A cardiac image dataset may be obtained by performing a Magnetic Resonance Imaging (MRI) scan of a patient's heart. Once the scan is recorded it may for instance be visualized as a volume rendering, after applying proper classification and segmentation. By choosing different orientations of the camera of the volume rendered image, a sequence of images may be derived that form a movie.

Cardiologists welcome volume rendered images of the heart with coronaries, as this type of visualization resembles closely to what they will see, when they subsequently perform an operation on the patient. The natural way to inspect the coronaries is to view them one by one in the direction of the blood flow, starting at the aorta, moving downwards.

Currently, in order to define a fly-path in the medical image dataset the user selects certain so-called key images. These key images are images on the fly-path of the camera. Once the user has selected all the key images he likes, a fly-path is calculated by interpolating the geometrical properties of the key images; these are, origin in space, orientation in space and the zoom factor. Apart from these manually selected key images there also exist automatic fly-paths, e.g. simple mathematical paths, such as e.g. a circle around the object. Subsequently, a movie comprised of images along the fly-path may be created and presented to the user.

A problem with current fly-path movies is that the structure of interest may be difficult to identify or other structures may obstruct the view to the structure of interest. Hence, an apparatus, method, computer-readable medium and use allowing for increased flexibility would be advantageous.

SUMMARY OF THE INVENTION

Accordingly, the present invention preferably seeks to mitigate, alleviate or eliminate one or more of the above-identified deficiencies in the art and disadvantages singly or in any combination and solves at least the above-mentioned problems by providing an apparatus, a method, a computer-readable medium, and use according to the appended patent claims.

According to an aspect of the invention an apparatus for processing of an image dataset comprising an object is provided. The apparatus comprises a segmentation unit configured to perform image segmentation of the object, an input unit configured to retrieve a predetermined set of key images being comprised in the image dataset, a processing unit configured to process each key image to have a predetermined classification, based on the segmented object and the key images, resulting in a set of processed key images, an interpolation unit configured to interpolate intermediate images along a path between the processed key images, and wherein the processing unit is further configured to calculate a classification of each interpolated image, and a movie creation unit configured to create a sequence of images, comprising the processed key images and the interpolated images.

According to another aspect of the invention a method for processing of an image dataset comprising an object is provided. The method comprises performing image segmentation of the object, retrieving a predetermined set of key images being comprised in the image dataset, processing each key image to have a predefined classification, based on the key images and the segmented object, resulting in a set of processed key images, interpolating intermediate images located along a path between the processed key images, and wherein the processing further comprises calculating a classification of each interpolated image, and creating a sequence of images, comprising the processed key images and the interpolated images.

According to yet another aspect of the invention a computer-readable medium having embodied thereon a computer program for processing of an image dataset comprising an object is provided. The computer program comprises a segmentation code segment for performing image segmentation of the object, a retrieve code segment for retrieving a predetermined set of key images being comprised in the image dataset, a process code segment for processing each key image to have a predefined classification, based on the key images and the segmented object, resulting in a set of processed key images, an interpolation code segment for interpolating intermediate images located on a path between the processed key images, and wherein the process code segment further comprises calculating a classification of each interpolated image, a movie creating code segment for creating a sequence of images, comprising the processed key images and the interpolated images.

According to another aspect of the invention a use of the apparatus according to claim 1 is provided for facilitating diagnosis or subsequent treatment or surgical treatment of an anatomical structure in a patient.

The proposed method focuses on volume rendered movies of whole heart MR scans. It solves the problems mentioned above, by enabling enhancement of the structures of interest, and moreover to enable change in opacity of the classification and segmentation data of the coronary arteries. As a result the opacity of various classifications may be changed throughout the fly-path movie and the structures of interest may be highlighted.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Figure 1:
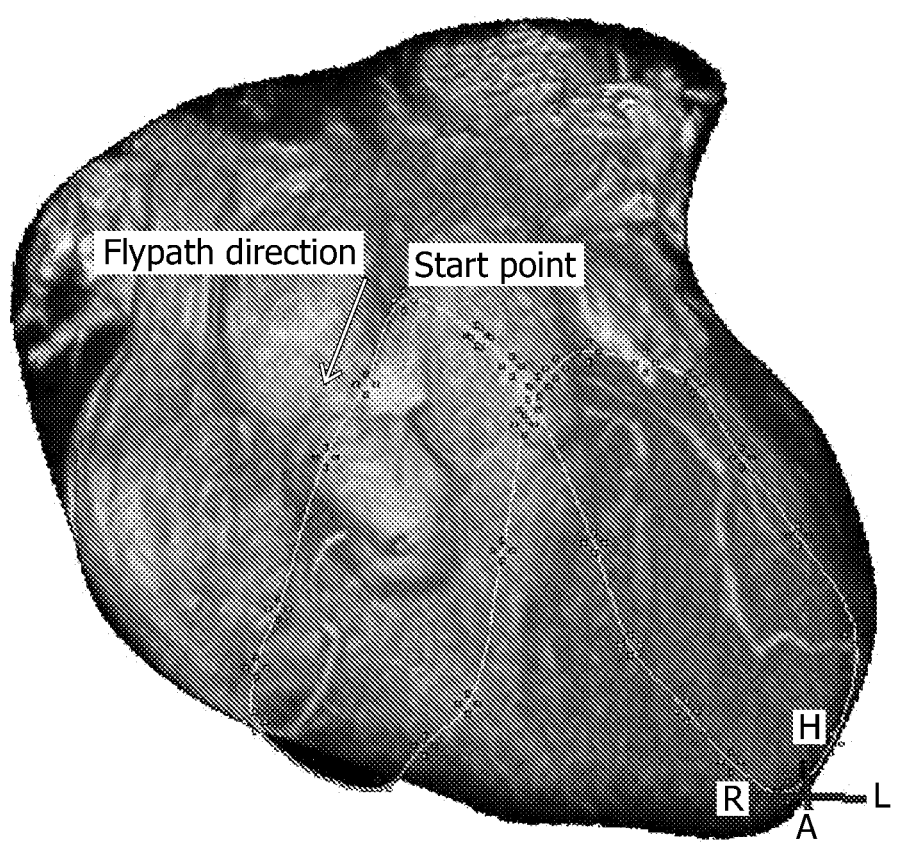
FIG. 1 is an illustration showing a volume rendered image of the heart.

FIG. 1 illustrates a volume rendered image of the heart, in which a preferred fly-path of the camera is drawn on the surface of the volume rendered image according to prior art. The fly-path is a path that describes the position in space of the camera. In this case this path is projected on a virtual sphere around the heart. The camera is always directed to the center point of this sphere. The camera on the fly-path follows the coronary arteries one by one, and is chosen such that it makes an "8 shape like" closed loop.

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

The following description focuses on embodiments of the present invention applicable to the field of imaging for enabling change in opacity or classification of an object during presentation in a fly-path movie comprising data from an image data set. The image dataset may be a volumetric image dataset, e.g. obtained using Computed Tomography, Magnetic Resonance Imaging, or Ultrasound Imaging.

Classification is a known technique to choose (during ray casting) only a range of grey-levels in the volume such that only specific structures are visible, and other structures are masked out. A transfer function is used to translate a certain grey value to a certain color value with a certain opacity.

Figure 2:
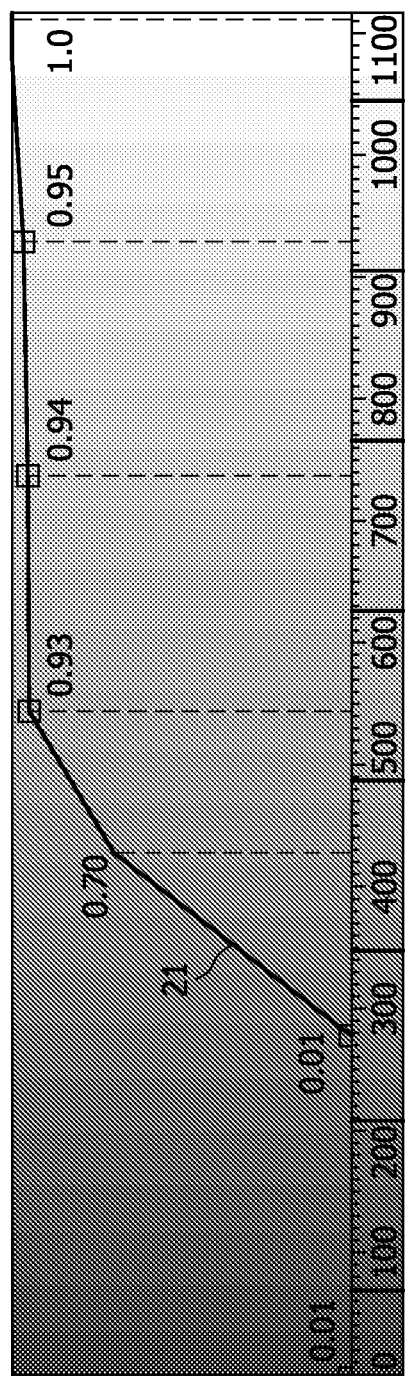
FIG. 2 is an illustration of a transfer function according to an embodiment.

FIG. 2 illustrates an example of a transfer function 21 according to an embodiment. All grey values between 0-280 are masked out. Voxels above 280 get a certain color and a certain opacity. Grey values above 1000 are fully opaque (opacity value=1.0), i.e. along a ray various voxel values contribute with a different color and a different opacity, resulting in a final color and opacity. When only the opacity parameter is modified this means the whole blue curve is multiplied with the alpha value. However, it is also possible to perform other operations other than just multiplication of a constant between 0 and 1. This could e.g. be a function with the slope further to the right or masking out higher pixel values in combination with a maximum opacity of 0.5 for instance. In this case indeed the entire classification is changed, and not only the opacity parameter of the classification.

Figure 3:
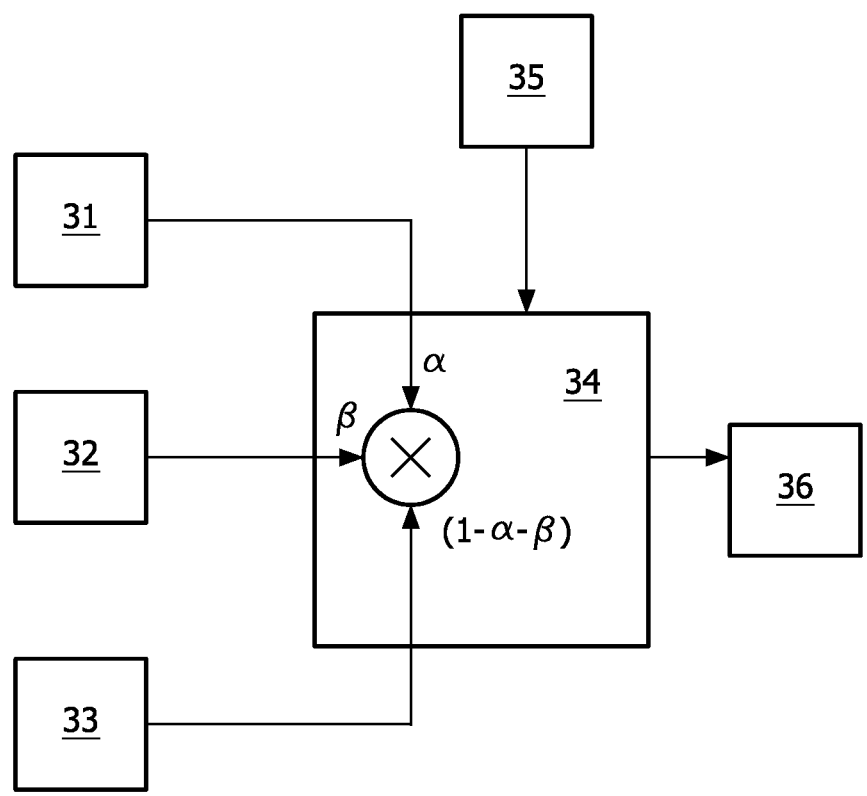
FIG. 3 is block diagram showing a method according to an embodiment.

FIG. 3 illustrates an embodiment wherein an image is created based on three segmented objects, first coronary 31, second coronary 32, and heart 33, each having a specific classification. A processing unit 34, 43 is configured to create an image with blended or merged classifications. Each classification has its own collection of voxels and its own color map. Each classification may be given a certain weight. Depending on the camera position 35 it is possible to apply a certain alpha, e.g. for a first coronary, or beta, e.g. for a second coronary, blending. The processing unit utilizes this information and is configured to create an image 36, such that the weight of each classification image is dependent on the camera position 35.

In some embodiments either alpha or beta is zero to 0, which means that only one of the two coronaries at the time is highlighted, while the other is not contributing at all. However, any percentage weight of alpha and beta may be used, such as for example alpha 80% and beta 5%. This setup means that the heart contributes for 15% in this case.

An extension of this scheme is that the opacity of each classification itself may be modified. This would more or less result in the same merge image, if the whole curve is multiplied by this alpha value, but it is also possible according to some embodiments to change the shape of the curve, such that only a part of an object is still a bit visible, which is a generalization.

Another known technique to isolate certain structures is segmentation. In this technique a specific collection of voxels is isolated.

In some embodiments a combination of segmentation techniques and classification is used in order to enhance visualization of the coronary located closest to the camera in a volumetric cardiac image dataset.

An idea of the present invention according to some embodiments is to perform segmentation on the image dataset from which a fly-path movie is to be created. For example, if the structure of interest in the medical image dataset is coronary arteries, the segmentation may be performed on the medical image dataset such as the coronary arteries may be identified in the medical image dataset.

According to another embodiment the segmentation of the object of interest may be performed on an already created fly-path movie comprising images included in the image dataset.

According to some embodiments the apparatus is configured to change the opacity value of the transfer function of the classification during the fly-path, e.g. such that the coronaries are enhanced one by one, when the camera focuses on the particular coronary artery. This means a particular object, such as artery, becomes more important than others, depending on the virtual camera position and its orientation.

By changing the classification or opacity means that the segmented object may be enhanced such that its visual appearance in the resulting fly-path movie may be easily differentiated from its surroundings by an observing user.

Figure 4:
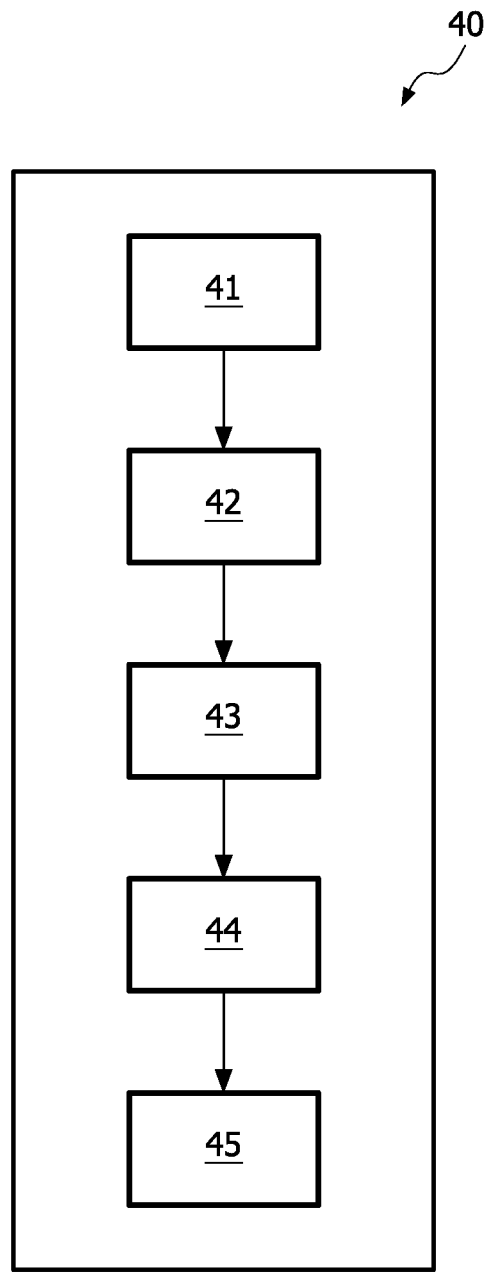
FIG. 4 is an illustration showing an apparatus according to an embodiment.

In an embodiment, according to FIG. 4, an apparatus 40 is provided. The apparatus comprises a segmentation unit 41 for performing segmentation of an object of interest, such as coronary arteries, in an anatomical structure, such as a heart, in an image dataset.

Any suitable commonly known image segmentation techniques may be used to perform the segmentation. The specific segmentation technique used in the apparatus may vary from time to time, depending on the object type, or e.g. as segmentation techniques constantly being improved. It should be appreciated that the invention according to some embodiments is not limited to a specific segmentation technique.

The apparatus 40 may also comprise an input unit 42 configured to retrieve a predetermined set of key images that are comprised in the image dataset. The key images define the camera position and orientation at certain locations along a fly-path. The fly-path may be previously manually defined or previously automatically calculated.

In some embodiments the input unit 42 may be configured to retrieve a predetermined fly-path movie, and to select a number of key images from the fly-path movie.

The apparatus may also comprise a processing unit 43 configured to process each key image to have a predefined classification, resulting in a set of processed key images.

In this way the segmented object of interest may be enhanced compared to its surroundings in some key images.

The apparatus may also comprise an interpolation unit 44 configured to interpolate intermediate images located on the fly-path between the processed key images. The processing unit 43 may be further configured to calculate a classification of each interpolated image.

The apparatus may further comprise a movie creation unit 45 configured to create a sequence of images, comprising the processed key images and the interpolated images. The created image sequence constitutes a fly-path movie comprising images with different classification.

In some embodiments the fly-path movie comprises images following the segmented object along a fly path.

Three orthogonal rotational axes may be used to define the orientation of the virtual camera along a 3D fly-path. The interpolation unit may interpolate the intermediate images based on information of the camera orientation along the fly-path. Preferably the camera is oriented such that the segmented object or optionally sub objects are located in front of the camera. In some embodiments, two of the three rotations are determined by the fact that the camera is always pointing towards a center point defined in the image dataset. For example, the center point may be the center point in a virtual sphere comprising the segmented objects. In this case, the fly-path may be an arc on the virtual sphere surface and the camera will always point towards the center point of the virtual sphere.

The remaining third axis may be said to describe the horizon component of the orientation.

Figure 5:
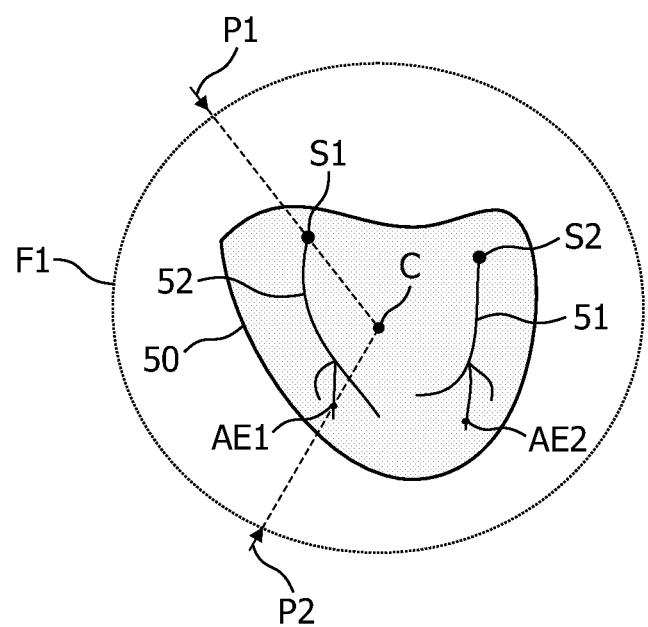
FIG. 5 is an illustration showing a fly-path according to an embodiment.

FIG. 5 illustrates the fly-path around an object 50, which in this case is a heart, and two sub objects 51, 52 that represent the two coronary arteries of the heart. A start point S1, S2 and an end point AE1, AE2 for each sub object may be observed. C indicates the center point. P1 indicates a vector that originates from the center point and passes the start point S1 in the sub object 51. P2 indicates a vector that originates from the center point and passes the end point S2 in the sub object 51. The camera fly path may be defined at a fixed distance, from the center point. Accordingly the camera fly-path may be illustrated as being located on the surface of a virtual sphere having a radius such that the whole heart fits inside this virtual sphere. The camera is on the surface of this virtual sphere and is always pointing in the direction of the center point. The coordinates of a point of the fly-path may be calculated utilizing a vector for each point along the sub object originating from the center point. The coordinate at which this vector intersects the surface of the virtual sphere will be a point of the fly path. Accordingly, the coordinate at which vector P1 intersects the surface of the virtual sphere will represent the start point of the fly-path. Similarly, the coordinate at which vector P2 intersects the surface of the virtual sphere will represent an end point of the fly-path. In this way the fly-path F1 may be calculated. Accordingly, the fly-path will be an arc on the surface of the virtual sphere.

As an example, the input unit 42 may retrieve four key images of a cardiac image dataset defining four main camera positions/orientations on a fly-path. For example, these four camera positions may be defined as the start points of the two coronary arteries and their average end points, respectively. An average end point may be calculated if the sib object comprises a split structure, such that it may contain several end points. The several end points may thus be averaged to a single averaged end point, e.g. by calculating a vector for each end point and then average the vectors to find the average end point.

Figures 6A, 6B:
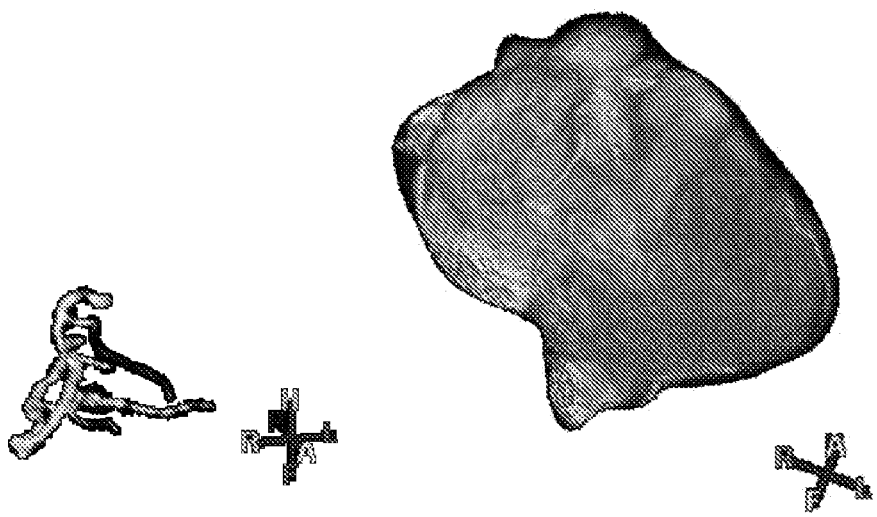
FIG. 6a is an illustration showing a key image according to an embodiment.
FIG. 6b is an illustration showing a key image according to an embodiment.
Figures 6C, 6D:
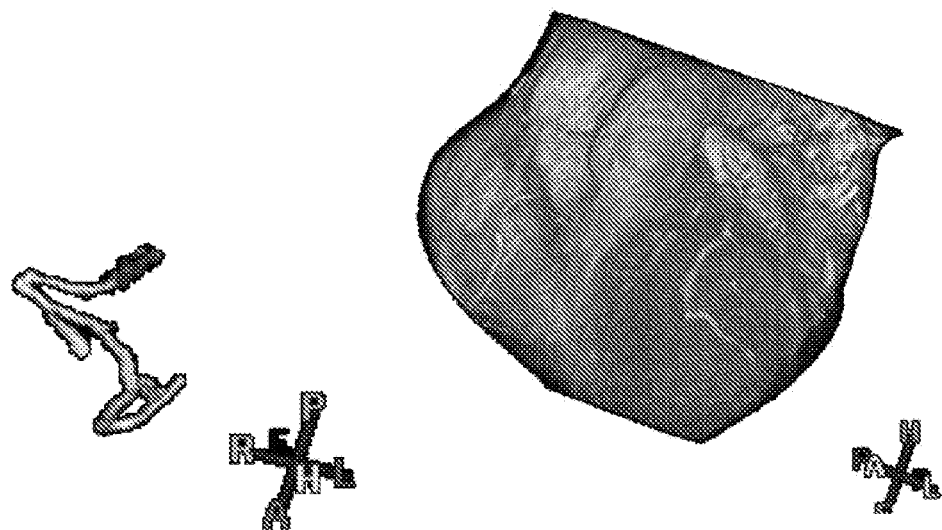
FIG. 6c is an illustration showing a key image according to an embodiment.
FIG. 6d is an illustration showing a key image according to an embodiment.

FIG. 6 illustrates four key images having different classifications. FIG. 6a illustrates a first key image, Key Image 1, of a first coronary artery, wherein the first key image has a camera position/orientation according to a start point of the first coronary artery. FIG. 6b illustrates a second key image, Key Image 2, of the whole heart, wherein the second key image has a camera position/orientation according to an average end point of the first coronary artery. FIG. 6c illustrates a third key image, Key Image 3, of the second coronary, wherein the third key image has a camera position/orientation according to a start point of the second coronary artery. FIG. 6d illustrates a fourth key image, Key Image 4, wherein the fourth key image has a camera position/orientation according to an average end point of the second coronary artery. These four key-images may represent the "turning points" of an 8-shape-like fly-path, as e.g. may be observed in FIG. 7.

In some embodiments, each processed key image will have a predefined classification. Moreover, the processing unit 43 may be configured to calculate a classification of each interpolated image.

The classification may include any type of modification of the visual appearance of the segmented object.

In some embodiments, the classification calculation may include color-coding such that the segmented object is color-coded in the resulting fly-path movie.

In some embodiments this means that the coronaries are enhanced during the fly-path one by one. In the case of a cardiac image dataset, the first artery e.g. during fly-by may be enhanced, e.g. in blue color, while the second artery, is e.g. brown in color. In another part of the fly-path movie when the camera flies by the second artery along the fly-path, the second artery may be color-coded blue in the movie, while the first artery may be color-coded brown. Accordingly, it is possible to give both coronaries any color, or opacity value. A color look up table may also be used to determine the color. In this case the grey value of each voxel may determine the color using the color look up table.

In some embodiments the processing unit is configured to calculate a classification of each interpolated image, based on the classification of the image before and after each interpolated image along the fly-path.

The calculation of classification of each interpolated image may be performed using alpha blending. Accordingly the value of each pixel in the classified interpolated image may be calculated as:

$$I_{class}(x,y,z) = I_{seg\_obj}(x,y,z)(1.0-\alpha) + I_{int}(x,y,z)(\alpha).$$

This means that if the α value is selected to be 0, only the pixel values of the corresponding pixel in the segmented image dataset have impact on the pixel value of the classified interpolated image. Accordingly, this means that the classified interpolated image will have the same classification as the segmented object and thus the segmented object will be visual. Accordingly, if the α value is selected to be 1, then no segmented object information will be comprised in the classified interpolated image.

As an example Key Image 1 may have predefined cc value of 1, and Key Image 2 may have predefined α value of 0. Furthermore the interpolation unit may calculate four interpolated images located along the fly-path between the two key images. In this case the calculated classifications of the interpolated images could be calculated using a linear function, such that they will vary linearly between Key Image 1 to Key Image 2. Thus the corresponding α value would be 1 (Key Image 1), 0.8 (interpolated image 1), 0.6 (interpolated image 2), 0.4 (interpolated image 3), 0.2 (interpolated image 4), and 0 (Key Image 2). In this way the classification may be smoothly faded from one classification to the other.

In an embodiment the processing unit may utilize a linear function to calculate the classification of an interpolated image.

In other embodiments the processing unit may utilize a non-linear function, such as a cosine function, to calculate the classification of an interpolated image. For example, suppose to define n images on a path-segment, starting with KeyImage 1 and ending with KeyImage 2. By utilizing a non-linear function such as a cosine function, the opacity of KeyImage 1 may be decreased to 0 at result image n during the first 90 degrees of the cosine function. Moreover, the opacity of KeyImage 2 may be increased to 1 at image n during the first 90 degrees by utilizing the inverse of the cosine function. For this particular example the first images on the segment have less change in opacity then the last images in this segment. This results in a different fading speed, and consequently a non-linear fading of opacity.

In other embodiments the processing unit may utilize a step function to calculate the classification of an interpolated image.

Figure 7:
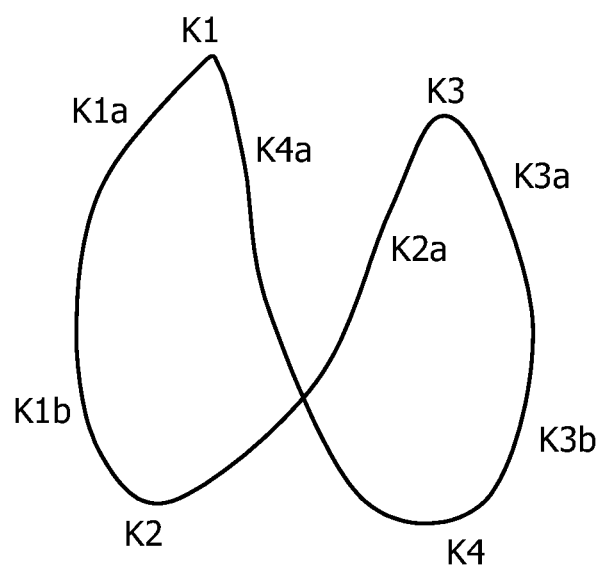
FIG. 7 is an illustration of an embodiment showing a set of key images along a fly-path having different classification.

In another embodiment the processing unit may process a selected number of interpolated images to have a predefined classification, and thus these interpolated images will act as if they where key images. Accordingly, a specific classification may be defined for any interpolated image. FIG. 7 illustrates a fly path with a set of original key images K1 to K4, and a derived set of key images K1a, K1b, K2a, K3a, K3b, K4a, i.e. interpolated images acting as key images. The position on the path of these derived key images is chosen relatively close to their primary key images. The purpose of this is to define smaller segments where fading takes place from one classification to the other. While in the remaining larger segments of the fly-path the classification may be kept constant. As an example, the classification of the number of interpolated images located in between Key Image 1 to Key Image 4 may be defined or calculated as:

Key Image 1

Key Image 1a=75% of Key Image 1 and 25% of Key Image 2

Key Image 1b=75% of Key Image 1 and 25% of Key Image 2

Key Image 2

Key Image 2a=75% of Key Image 2 and 25% of Key Image 3

Key Image 3

Key Image 3a=75% of Key Image 3 and 25% of Key Image 4

Key Image 3b=75% of Key Image 3 and 25% of Key Image 4

Key Image 4

Key Image 4a=75% of Key Image 4 and 25% of Key Image 1

In this way the classification of each interpolated image may be defined using the processing unit.

In some embodiments the movie creation unit is configured to create a movie that comprises images without any discontinuities while variably enhancing the object of interest. Accordingly, the fly-path may be closed. A benefit of this is that the movie may be played over and over again and has no annoying jumps while the object of interest is variably enhanced.

In an embodiment the segmented object may comprise at least one sub object. In a practical example the object may be the coronary arteries, a first sub object may be a first coronary artery, and a second sub object may be a second coronary artery. The processing unit may according to some embodiments calculate a classification of an image depending on either of the segmented sub objects. Thus, the first coronary artery may be enhanced, i.e. highlighted, in one part of the fly-path movie and the second coronary artery may be highlighted in another part of the fly-path movie. Accordingly, the classification of an image in the subsequently created fly-path movie will be dependent on the segmented object or segmented sub objects.

In some embodiments the segmentation unit 41, input unit 42, processing unit 43, interpolation unit 44, or movie creation unit 45, may be comprised into one integral, such as one unit.

Figure 8:
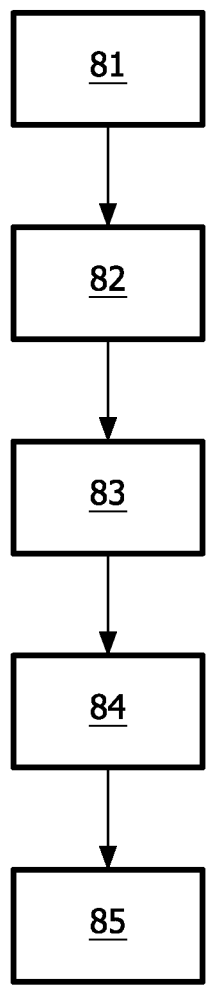
FIG. 8 is a flow chart showing a method according to an embodiment.

In an embodiment, according to FIG. 8, a method for processing of an image dataset comprising an object is provided. The method comprises performing 81 image segmentation of the object. Moreover, the method comprises retrieving 82 a predetermined set of key images being comprised in the image dataset. Furthermore, the method comprises processing 83 each key image to have a predefined classification, based on the key images and the segmented object, resulting in a set of processed key images. The method may also comprise interpolating 84 intermediate images located on a path between the processed key images, and wherein the processing further comprises calculating a classification of each interpolated image. Moreover, the method may comprise creating 85 a sequence of images, comprising the processed key images and the interpolated images.

Figure 9:
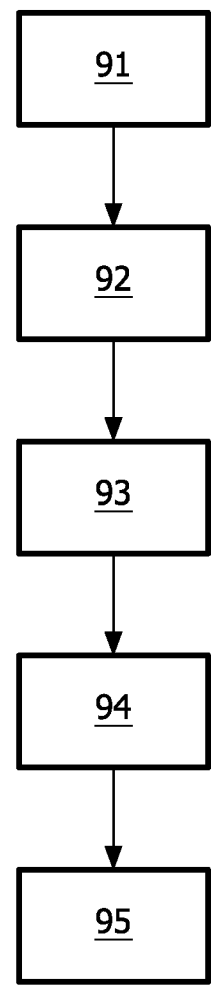
FIG. 9 is an illustration showing a computer program according to an embodiment.

In an embodiment, according to FIG. 9, a computer-readable medium having embodied thereon a computer program for processing by a computer and for processing of an image dataset comprising an object is provided. The computer program comprises a segmentation code segment 91 for performing image segmentation of the object. Moreover, the computer program comprises a retrieve code segment 92 for retrieving a predetermined set of key images being comprised in the image dataset. Furthermore, the computer program comprises a process code segment 93 for processing each key image to have a predefined classification, based on the key images and the segmented object, resulting in a set of processed key images. The computer program may also comprise an interpolation code segment for interpolating 94 intermediate images located on a path between the processed key images, and wherein the process code segment 93 further comprises calculating a classification of each interpolated image. Moreover, the computer program may comprise a movie creating code segment 85 for creating a sequence of images, comprising the processed key images and the interpolated images.

In an embodiment, a use of the method, apparatus or computer program is provided for facilitating diagnosis or subsequent treatment or surgical treatment of an object in an image dataset.

Applications and use of the above-described embodiments according to the invention are various and include all applications where movie generation of volume-rendered images comprising e.g. heart data is desired.

The segmentation unit, input unit, processing unit, interpolation unit, and motion creation unit may be any unit normally used for performing the involved tasks, e.g. a hardware, such as a processor with a memory. The processor may be any of variety of processors, such as Intel or AMD processors, CPUs, microprocessors, Programmable Intelligent Computer (PIC) microcontrollers, Digital Signal Processors (DSP), etc. However, the scope of the invention is not limited to these specific processors. The memory may be any memory capable of storing information, such as Random Access Memories (RAM) such as, Double Density RAM (DDR, DDR2), Single Density RAM (SDRAM), Static RAM (SRAM), Dynamic RAM (DRAM), Video RAM (VRAM), etc. The memory may also be a FLASH memory such as a USB, Compact Flash, SmartMedia, MMC memory, MemoryStick, SD Card, MiniSD, MicroSD, xD Card, TransFlash, and MicroDrive memory etc. However, the scope of the invention is not limited to these specific memories.

In an embodiment the apparatus is comprised in a medical workstation or medical system, such as a Computed Tomography (CT) system, Magnetic Resonance Imaging (MRI) System or Ultrasound Imaging (US) system.

In an embodiment the computer-readable medium comprises code segments arranged, when run by an apparatus having computer-processing properties, for performing all of the method steps defined in some embodiments.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. An apparatus for processing of an image dataset comprising an object, said apparatus comprising:
    a segmentation unit configured to perform image segmentation of said object,
    an input unit configured to retrieve a predetermined set of key images being comprised in the image dataset,
    a processing unit configured to process each key image to have a predetermined classification value for each voxel, based on said segmented object and said key images, resulting in a set of processed key images,
    an interpolation unit configured to interpolate intermediate images along a path between two processed key images, and wherein said processing unit is further configured to calculate a classification value of each voxel of each interpolated image; wherein the value of each voxel in the classified interpolated image is calculated as;

$$I_{class}(x,y,z) = I_{seg\_obj}(x,y,z)(1.0-\alpha) + I_{int}(x,y,z)(\alpha)$$

wherein x,y, and z are coordinates of the voxel value to be calculated, $I_{seg\_obj}(x,y,z)$ is the value of a voxel of a segmented object at voxel (x,y,z), $I_{int}(x,y,z)$ is a value of a voxel of a segmented sub object of interest at voxel (x,y,z), $\alpha$ is a weight between 0 and 1, and $I_{class}(x,y,z)$ is a value to be assigned to a voxel at the coordinates (x,y,z) in the classified interpolated image, and
    a movie creation unit configured to create a sequence of images, comprising the processed key images and the interpolated images.

2. The apparatus according to claim 1, wherein said object comprises at least one segmented sub object, wherein the classification value of each voxel of each processed key image comprises a first classification weight of said segmented object and a second classification weight of said segmented sub object.

3. The apparatus according to claim 1, wherein said retrieved set of key images are comprised in an existing fly-path image sequence, wherein the object comprises a plurality of sub objects, each sub object being a split object having a start point, a plurality of end points, and an average end point being an average of the plurality of endpoints of the respective sub object, the fly path determined by the start position and the average end position of each sub object.

4. The apparatus according to claim 1, wherein said intermediate images are comprised in an existing fly-path image sequence, and wherein said interpolation unit is configured to extract said intermediate images from said fly-path image sequence.

5. The apparatus according to claim 1, wherein the classification pertains to any one of: opacity, color-coding, or brightness enhancement of said object.

6. The apparatus according to claim 1, wherein said processing unit calculates the classification of each interpolated image using a linear function.

7. The apparatus according to claim 1, wherein said processing unit utilizes alpha blending to calculate a classification value of each key image, and wherein said segmented object has a certain opacity in each of said processed key images.

8. The apparatus according to claim 1, wherein the classification value of each voxel of each interpolated image is dependent on the classification value of at least two key images and on a virtual camera position at the interpolated image.

9. The apparatus according to claim 1, wherein the object is an anatomical structure in a patient, the structure undergoing diagnosis or treatment.

10. The apparatus according to claim 2, wherein the classification value of each voxel of each interpolated image is dependent on the classification weight of the segmented object and the classification weight of the at least one segmented sub object of at least two key images.

11. The apparatus according to claim 2, wherein said object is a heart and said sub object is a first coronary artery of the heart, the key images including images of the heart from a sequence of locations and including images of the first coronary artery from the sequence of locations, and wherein the interpolation unit combines heart images and first coronary artery images from corresponding locations with relative weightings based on the locations.

12. The apparatus according to claim 2, wherein said processing unit is configured to calculate the classification value of at least one of said key image and said interpolated image such that said object or sub object located closest to the fly path is enhanced.

13. The apparatus according to claim 11, wherein the heart further comprises a second segmented sub object which is a second coronary artery having a third classification weight, and wherein the interpolation unit combines heart, first coronary, and second coronary images from the sequence of locations using a relative weighting based on a virtual camera position whereby the first coronary is more enhanced when the first coronary is closest to the virtual camera position and the second coronary is more enhanced when the second coronary is closest to the virtual camera.

14. The apparatus according to claim 3, wherein there are two sub objects and the fly path is a figure eight having two loops, each loop encircling the start and average end point of one of the two sub objects.

15. The apparatus according to claim 14, wherein said processing unit is configured to calculate the classification of at least one of said key image and said interpolated image such that the sub object located closest to a virtual camera is enhanced.

16. An apparatus configured to process an image dataset depicting an object, the apparatus including one or more processors configured to:
perform image segmentation of said object;
retrieve a predetermined set of key images being comprised in the image dataset;
process each key image to have a predetermined classification value for each voxel, based on said segmented object and said key images, resulting in a set of processed key images;
interpolate intermediate images along a path between two processed key images, and wherein the processor is further configured to calculate a classification value of each voxel of each interpolated image wherein the value of each voxel in the classified interpolated image is calculated as:

$$I_{class}(x,y,z)=I_{seg\_obj}(x,y,z)(1.0-\alpha)+I_{int}(x,y,z)(\alpha)$$

wherein x,y, and z are the coordinates of the voxel value to be calculated, $I_{seg\_obj}(x,y,z)$ is the value of a voxel of a segmented object at voxel (x,y,z), $I_{int}(x,y,z)$ is a value of a voxel of a segmented sub object of interest at voxel (x,y,z), α is a weight between 0 and 1, and $I_{class}(x,y,z)$ is a value to be assigned to a voxel at the coordinates (x,y,z) in the classified interpolated image; and
create a sequence of images, including the processed key images and the interpolated images.

17. The apparatus according to claim 1, wherein said processing unit utilizes a transfer function to translate a certain grey value of a voxel of a key image or interpolated image to a certain color value with a certain opacity.

18. A method for processing of an image dataset comprising an object, said method comprising:

performing image segmentation of said object,
retrieving a predetermined set of key images being comprised in the image dataset,
processing each key image to have a predefined classification of each voxel of the key image, based on said key images and said segmented object, resulting in a set of processed key images,
interpolating intermediate images located on a path between the processed key images, and wherein the processing further comprises calculating a weighting of each vowel of each interpolated image based on location along the path, wherein the value of each voxel in the classified interpolated image is calculated as:

$$I_{class}(x,y,z)=I_{seg\_obj}(x,y,z)(1.0-\alpha)+I_{int}(x,y,z)(\alpha)$$

wherein x,y, and z are the coordinates of the voxel value to be calculated, $I_{seg\_obj}(x,y,z)$ is the value of voxel of a segmented object at voxel ( (x,y,z), $I_{int}(x,y,z)$ is a value of a voxel of a segmented sub object of interest at voxel (x,y,z), α is a weight between 0 and 1, and $I_{class}(x,y,z)$ is a value to be assigned to a voxel at the coordinates (x,y,z) in the classified interpolated image, and
creating a sequence of images, comprising the processed key images and the interpolated images.

19. A non-transitory computer-readable medium having embodied thereon a computer program for processing of an image dataset comprising an object, said computer program comprises:
a segmentation code segment for performing image segmentation of said object,
a retrieve code segment for retrieving a predetermined set of key images being comprised in the image dataset,
a process code segment for processing each key image to have a predefined classification value for each voxel of the key image, based on the key images and said segmented object, resulting in a set of processed key images,
an interpolation code segment for interpolating intermediate images located along a path between the processed key images, and wherein the process code segment further comprises calculating a classification value of each interpolated image, based on the classification value of at least two key images, wherein the value of each voxel in the classified interpolated image is calculated as:

$$I_{class}(x,y,z)=I_{seg\_obj}(x,y,z)(1.0-\alpha)+I_{int}(x,y,z)(\alpha)$$

wherein x,y, and z are coordinates of the voxel value to be calculated, $I_{seg\_obj}(x,y,z)$ is the value of a voxel of a segmented object at voxel (x,y,z), $I_{int}(x,y,z)$ is a value of a voxel of a segmented sub object of interest at voxel (x,y,z), α is a weight between 0 and 1, and $I_{class}(x,y,z)$ is a value to be assigned to a voxel at the coordinates (x,y,z) in the classified interpolated image, and
a movie creation unit configured to create a sequence of images, comprising the processed key images and the interpolated images.

20. An apparatus for processing an image data set of an object, the apparatus comprising:
one or more processors configured to perform the method of claim 18; and
a display device on which the sequence of images is displayed.

* * * * *